(No Model.)
P. HERDIC.
Running Gear for Vehicles.
No. 238,900. Patented March 15, 1881.
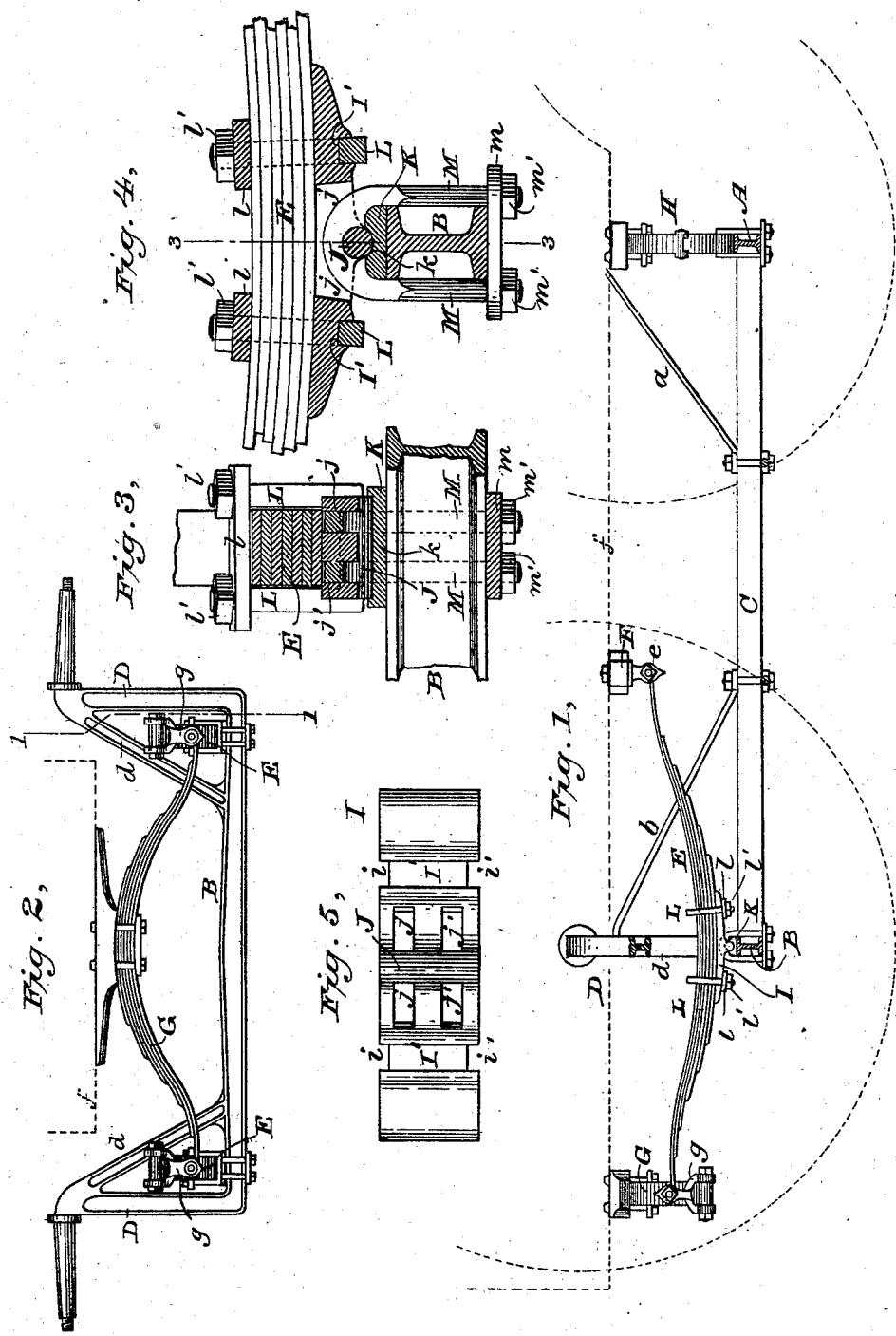
WITNESSES
Wm A. Skinkle
Geo. W. Breck
By his Attorneys
Baldwin, Hopkins & Peyton
INVENTOR
Peter Herdic,

UNITED STATES PATENT OFFICE.

PETER HERDIC, OF PHILADELPHIA, PENNSYLVANIA.

RUNNING-GEAR FOR VEHICLES.

SPECIFICATION forming part of Letters Patent No. 238,900, dated March 15, 1881.

Application filed January 17, 1881. (No model.)

*To all whom it may concern:*

Be it known that I, PETER HERDIC, of the city of Philadelphia, in the State of Pennsylvania, have invented certain new and useful Improvements in Vehicles, of which the following is a specification.

My invention relates to improvements in vehicles of the class having cranked rear axles, and especially pertains to the springs by which the body of a vehicle is connected with and supported upon its rear axle.

My object mainly is so to construct the springs, mount them upon the axle, and connect them together and with the vehicle-body, that they shall be self-adjusting to compensate for variations in the movements or inclined position of the vehicle-body, and so avoid unnecessary strain upon the parts and prevent inequality in the action or elasticity of the springs from variations in the inclination of the body, such as would be produced by the unequal rising-and-falling movements of the opposite ends of the vehicle.

In accordance with my invention the rear springs are mounted so as to be free to rock upon the axle, and so that, no matter what change may take place in the inclination of the vehicle-body relatively to the horizontal plane of the axle or the level of the point about which the springs rock, they will accommodate themselves to such change, and so equalize or properly distribute the pressure upon the opposite ends of the springs. The springs, which are directly connected with the axle, are supported upon it about midway their lengths, so as to rock vertically upon the axle, and are connected by joints at their front ends with a cross-bar fastened to the under side of the vehicle-body, and at their rear ends the springs are jointed to a third or cross spring suitably attached to the bottom of the vehicle-body. At front the body is supported by a suitable spring or springs fastened to the front axle. The rear cranked axles are braced, as shown in United States Letters Patent granted to me April 20, 1880, No. 226,748, and reference is hereby made to my said patent for illustration of such features of a suitable vehicle not hereinafter specifically described as may be needed for a complete understanding of my present invention as applied to a passenger-vehicle of preferred construction.

The subject-matter claimed will hereinafter be designated after first fully describing my improvements in connection with a "Herdic" coach, such parts only of which are shown in the accompanying drawings as are deemed necessary for illustrating the adaptation thereto of my improvements.

Figure 1 is a view partly in side elevation and partly in section, the plane of section through the rear axle being indicated by the line 1 1 of Fig. 2. The wheels and the body are represented by dotted lines. Fig. 2 is a rear elevation. Fig. 3 is a view partly in elevation and partly in vertical section, in the plane indicated by the line 3 3 of Fig. 4, representing in detail the devices for securing one of the rocking springs to the axle; Fig. 4, a section view of the same parts, the section being at a right angle to that represented in the preceding figure; and Fig. 5 is a view, as seen from the under side, of the spring seat-plate or fastening-shoe by which the spring is supported and clamped in place.

A front axle-tree or axle proper, A, provided with swinging axle-arms, and a rear axle, B, are connected by a two-part reach, C, which maintains the parallelism of the two axles at all times, and the axles are connected by brace-bars with the reach, as in my prior patent above referred to. Two of these braces, *a b*, are shown.

The rear cranked and braced axle may be of cast-steel or of wrought-iron, or partly of both. Between the cranks D D and the struts or braces *d d* springs E E, extending in the direction of the length of the vehicle, are mounted upon the axle B, each spring being so fastened to the axle between its adjacent crank D and brace *d* that it may rock vertically. Each of the springs E E is jointed at its front end to its respective bracket or stirrup *e*, one such bracket being provided for each of the springs and secured to the ends of the cross-bar F, by which the springs connect at front with the bottom *f* of the low-down vehicle-body, represented in dotted lines. At their rear ends the springs E E have jointed connection with the ends of a cross-spring, G, by means of pendent supports or hanging brackets *g g*. The cross-spring is suitably connected at its center to the vehicle-bottom. (See Fig. 2.) Instead of the spring G, a bar similar to that to which the fronts of the springs E E connect might be used.

The vehicle-body is supported at front upon the axle A by a suitable spring, H, or two springs. The spring H is firmly secured to the axle in usual and proper way.

The devices in this instance used for securing the rocking springs upon the braced cranked axle will now be described. As the springs are both secured in the same way, description of one set only of securing devices will be given.

A rocking seat-plate or fastening-shoe, I, for the spring is made of a width somewhat greater than that of the leaves or plates of the spring, and is provided on opposite sides of its middle—say about midway between the center of its length and its ends—with upright grooves or vertical recesses $i\ i$ at one side or edge and diametrically opposite or corresponding grooves $i'\ i'$ in the other edge. These pairs of edge-grooves $i\ i'$ terminate at bottom in cross-grooves $I'\ I'$. At its middle the rocking shoe I has a rounded transverse projection or bearing-boss, J, to fit in a corresponding seat or socket, $k$, in a supporting-shoe or stationary plate, K, on top of the axle. Two pairs of slots, $j\ j$ and $j'\ j'$, are made in the rocking shoe I, and between the adjacent ends of the pairs of slots the bearing-boss J is made cylindrical, while at other points it is of somewhat semicircular shape, being rounded on its under side to fit the supporting-shoe seat $k$, as shown in Figs. 3 and 4; or, if preferred, the boss may be adapted to fit a seat formed directly in the top of the axle, thus dispensing with the stationary shoe K. As this shoe serves to protect and strengthen the axle, its use is preferred. The spring is clamped in its seat plate or shoe I by a pair of clips, L L, the threaded ends of which pass through the cross-pieces $l\ l$, and are provided with nuts $l'\ l'$. Instead of having the cross-pieces $l\ l$ rest upon and span the top plate of the spring, as in Figs. 3 and 4, the cross-pieces might be underneath and next the shoe I, as represented in Fig. 1, but not with such perfect result.

Clip-irons M M, their cross-pieces $m\ m$, and nuts $m'$ serve to firmly connect the shoe I with the axle B. Each clip M passes through its pair of slots $j\ j$ or $j'\ j'$ and embraces or fits partially around the boss J, where it separates, the adjacent ends of the slots constituting a pair. By tightening the nuts $m'$ the shoe I is drawn down securely with its boss J in the bearing recess or socket of the stationary shoe K. Endwise movement of the boss J in its seat is guarded against by the end walls or shoulders of the recess $k$, without requiring that the rocking shoe be clamped down so tightly as to interfere with its proper rocking movement. The clips M M, it should be noticed, (see Fig. 4,) bear upon the stationary shoe K at the sides of the boss J.

By the employment of the rocking springs and their attachments it will readily be seen that, no matter how the load to be sustained shall be distributed over the vehicle-body, the springs are self-adjusting by rocking on the axle, and maintain under the same weight practically the same amount of spring or resilience throughout, notwithstanding the variations in the inclination of the body by either the front or the rear end being depressed without corresponding movement of the other end.

I claim as of my own invention—

1. The combination of the cranked axle, the rocking springs secured thereto, and the vehicle-body supported upon the springs, substantially in the manner and for the purpose hereinbefore set forth.

2. The combination of the cranked and braced rear axle, the front axle-tree, or axle proper, held parallel therewith, the vehicle-body having spring-connection with the front axle, and the rocking springs supporting the rear of the vehicle-body upon the cranked axle, substantially as and for the purpose hereinbefore set forth.

3. The combination of the cranked axle, the rocking springs E E, the cross-bar to which their front ends are jointed, and the cross-spring having jointed connection with the rear ends of the rocking springs, substantially as and for the purpose hereinbefore set forth.

4. The rocking seat-plate or fastening-shoe I, having the bearing-boss J, and the slots for the clips, by which to secure it in place, substantially as hereinbefore set forth.

5. The combination of the rocking seat-plate or fastening-shoe I, provided with the bearing-boss J, the spring secured to said shoe, the supporting-shoe or stationary plate K, provided with the seat or recess for said boss, and the clips by which to secure the two shoes together and hold them upon the axle, substantially as hereinbefore set forth.

6. The combination of the spring, the rocking spring seat or shoe I, provided with the edge and bottom grooves, and the clips fitting said grooves and holding the spring, as and for the purpose described.

In testimony whereof I have hereunto subscribed my name.

P. HERDIC.

Witnesses:
WM. J. PEYTON,
JOSEPH I. PEYTON.